US012379079B2

(12) United States Patent
Werr et al.

(10) Patent No.: US 12,379,079 B2
(45) Date of Patent: *Aug. 5, 2025

(54) LIGHT MODULES FOR LUMINAIRES AND METHOD OF ASSEMBLING LUMINAIRES

(71) Applicant: HLI SOLUTIONS, INC., Greenville, SC (US)

(72) Inventors: Martin C. Werr, Easley, SC (US); Dhavalkumar P. Patel, Greer, SC (US); David J. Rector, Mauldin, SC (US); Randy K. Lewis, Greenville, SC (US); Raymond A. Brown, Greer, SC (US); David A. Simoni, Greenville, SC (US); Eric S. Walker, Anderson, SC (US); Duncan D. P. Jackson, Chicago, IL (US); Aidan Jamison, Brooklyn, NY (US); Niels Denekamp, Chicago, IL (US); Kristopher S. Steele, Brooklyn, NY (US); Eoin B. Billings, London (GB); Andrew Black, Chicago, IL (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,228

(22) Filed: Jul. 11, 2023

(65) Prior Publication Data

US 2023/0349521 A1 Nov. 2, 2023

Related U.S. Application Data

(63) Continuation of application No. 15/131,436, filed on Apr. 18, 2016, now Pat. No. 11,739,894.

(Continued)

(51) Int. Cl.

*F21S 8/02* (2006.01)
*F21V 7/00* (2006.01)

(Continued)

(52) U.S. Cl.

CPC ............ *F21S 8/026* (2013.01); *F21V 23/001* (2013.01); *F21V 7/0083* (2013.01);

(Continued)

(58) Field of Classification Search

CPC ...... F21S 8/026; F21V 23/001; F21V 7/0083; F21Y 2105/16; F21Y 2113/00; F21Y 2115/10

(Continued)

(56) References Cited

U.S. PATENT DOCUMENTS

| | | | | |
|---|---|---|---|---|
| 11,739,894 B2 * | 8/2023 | Werr | F21S 8/026 | 362/232 |
| 2006/0262545 A1 | 11/2006 | Piepgras | | |

(Continued)

OTHER PUBLICATIONS

892 Form dated Feb. 6, 2018 which was received in connection with U.S. Appl. No. 15/131,436.

(Continued)

*Primary Examiner* — Matthew Mikels
(74) *Attorney, Agent, or Firm* — Buckley, Maschoff & Talwalkar LLC

(57) ABSTRACT

A luminaire includes a support positioned in a ceiling. A light module is connected to the support having a base, a light emitter, and an optic. The light modules allow different luminaire configurations to be formed out of similar components.

16 Claims, 13 Drawing Sheets

Related U.S. Application Data

(60) Provisional application No. 62/159,584, filed on May 11, 2015, provisional application No. 62/149,137, filed on Apr. 17, 2015.

(51) Int. Cl.

| | |
|---|---|
| ***F21V 23/00*** | (2015.01) |
| ***F21Y 105/16*** | (2016.01) |
| ***F21Y 113/00*** | (2016.01) |
| ***F21Y 115/10*** | (2016.01) |

(52) U.S. Cl.
CPC ......... *F21V 23/008* (2013.01); *F21Y 2105/16* (2016.08); *F21Y 2113/00* (2013.01); *F21Y 2115/10* (2016.08)

(58) Field of Classification Search
USPC .......................................................... 362/232
See application file for complete search history.

(56) References Cited

U.S. PATENT DOCUMENTS

| | | | |
|---|---|---|---|
| 2011/0182065 | A1 | 7/2011 | Negley |
| 2014/0160742 | A1 | 6/2014 | Rodgers |
| 2015/0043223 | A1 | 2/2015 | Chen |
| 2015/0276136 | A1 | 10/2015 | Liang |
| 2016/0215987 | A1 | 7/2016 | Chad |

OTHER PUBLICATIONS

892 Form dated Jul. 30, 2019 which was received in connection with U.S. Appl. No. 15/131,436.
892 Form dated Jan. 31, 2020 which was received in connection with U.S. Appl. No. 15/131,436.
892 Form dated Aug. 27, 2020 which was received in connection with U.S. Appl. No. 15/131,436.
892 Form dated Jan. 30, 2023 which was received in connection with U.S. Appl. No. 15/131,436.
Notice of Allowance dated May 17, 2023 which was received in connection with U.S. Appl. No. 15/131,436.

* cited by examiner

LIGHT MODULES FOR LUMINAIRES AND METHOD OF ASSEMBLING LUMINAIRES

RELATED APPLICATIONS

This application is a continuation of U.S. patent application Ser. No. 15/131,436, filed Apr. 18, 2016 and is based on U.S. Provisional Application Ser. No. 62/149,137, filed Apr. 17, 2015, and Ser. No. 62/159,584, filed May 11, 2015 the disclosures of each of which are incorporated herein by reference in their entirety and to which benefit and priority is claimed.

FIELD

Various exemplary embodiments relate to luminaires and light modules for luminaires.

BACKGROUND

Luminaires, or light fixtures, are used with electric light sources to provide aesthetic and functional housing in both interior and exterior applications. Various types of interior luminaires include overhead, ceiling, recessed, ceiling system, or suspended luminaires. Typical overhead or ceiling luminaires include a housing and one or more light sources, for example florescent tubes, extending underneath a reflector.

SUMMARY

According to an exemplary embodiment, a luminaire includes a support positioned in a ceiling. A light module is connected to the support having a base, a light emitter, and an optic. The base includes a first side with a recessed portion for receiving the light emitter and a second side facing the support. A connecting feature extends from the second side of the base to connect the light module to the support. The light emitter has a plurality of light elements. The optic includes a plurality of optical elements aligned respectively with the plurality of light emitters.

According to another exemplary embodiment, a luminaire includes a support positioned in a ceiling having a first side and a second side. A light module is connected to the support having a base, a light emitter, and an optic. A cover is positioned over at least a portion of the second side of the support. A driver bracket is connected to the second side of the support. A driver is connected to the driver bracket and operably connected to the light emitter.

Another exemplary embodiment includes a method of assembling a luminaire. The method includes selecting a support and selecting a plurality of light modules having a base, a light emitter, and an optic. An opening is formed in the support corresponding to each light module. The light module is connected to the support with a snap-fit connection extending through the opening. A driver is connected to the support electrically connected to the light emitter of each light module.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
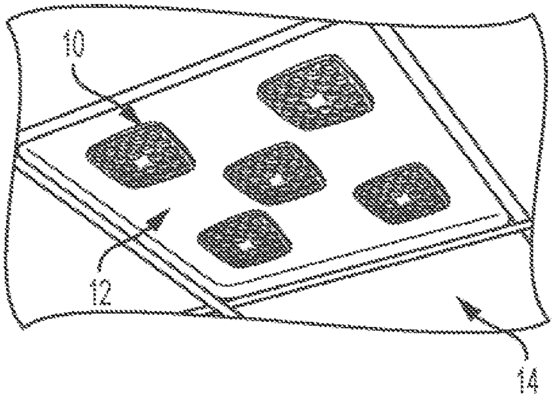
FIG. 1 is a bottom perspective view of an exemplary luminaire having a first layout.
Figure 2:
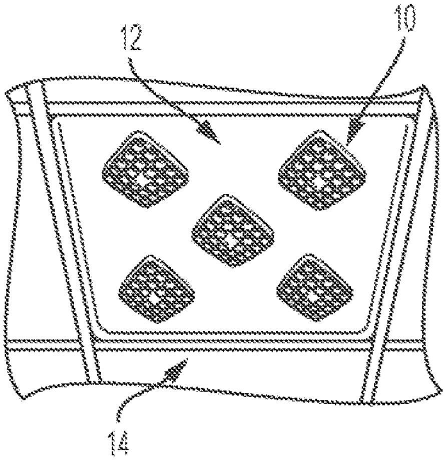
FIG. 2 is a bottom perspective view of an exemplary luminaire having a second layout.

Various exemplary embodiments are directed to luminaire components that can be used to create a variety of luminaires and methods of creating such luminaires. FIGS. 1-2 depict exemplary light modules 10 used in a luminaire. The light modules 10 are connected to a support 12. In the exemplary embodiment shown, the support 12 is a ceiling pan placed in a drop ceiling 14. Other suitable structures may be used depending on the location and the desired use of the luminaire, including pole or wall mounted applications. The support 12 can be different sizes and include different numbers, patterns, and orientations of light modules 10 to achieve a desired aesthetic appearance or light output.

Figure 3:
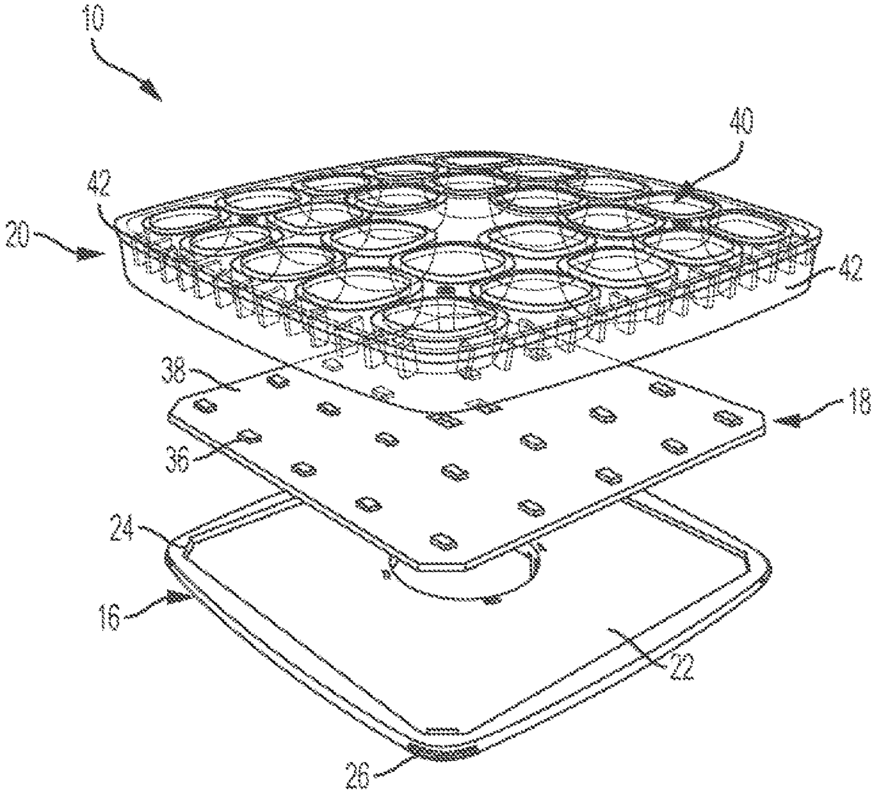
FIG. 3 is an exploded view of an exemplary light module.
Figure 4:
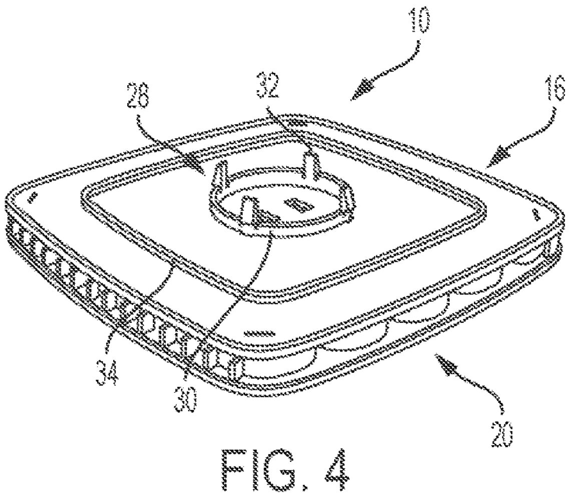
FIG. 4 is a top perspective view of the light module of FIG. 3.
Figure 5:
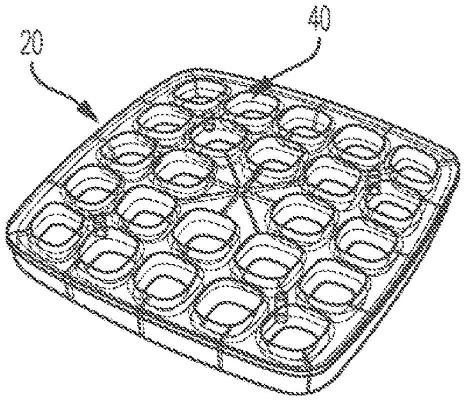
FIG. 5 is a bottom perspective view of an exemplary optic.
Figure 6:
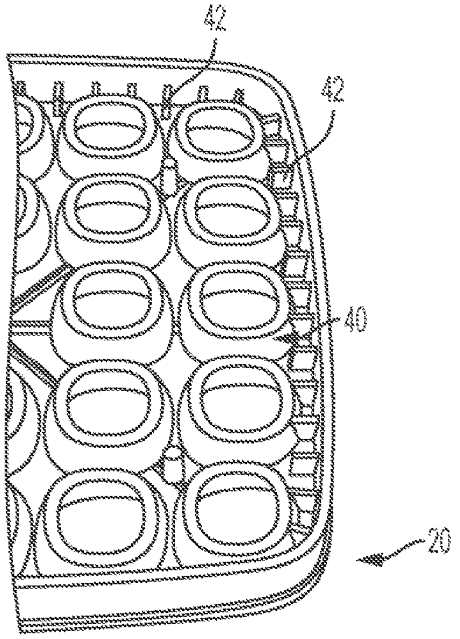
FIG. 6 is a top perspective view of the optic of FIG. 5.
Figure 7:
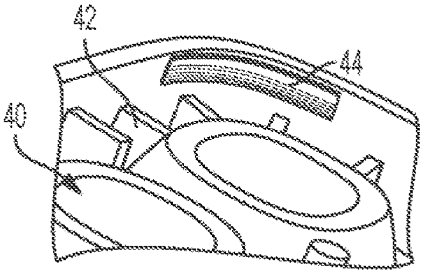
FIG. 7 is an enlarged, perspective view of the corner of the optic of FIG. 5.

FIGS. 3 and 4 show an exemplary light module 10 that includes a base 16, a light emitter, for example an LED board 18, and an optical element or optic 20. The base 16 can include metal, plastic, composites, or other suitable materials and can be a single-piece, unitary structure or formed from separate, connected pieces. The base 16 has a first side that faces the LED board 18 and a second side that faces the support 12. The exemplary base 16 has a substantially square configuration with rounded corners, although any number, shape, and combination of curvilinear and/or rectilinear sides can be used.

The first side of the base 16 includes a recessed portion 22 for receiving the LED board 18. A plurality of walls border the recessed portion 22. In the exemplary embodiment, eight walls are shown, with four major side walls and four chamfered corner edges. A brim 24 extends from a slot or undercut positioned in one or more of the walls, for example at one or more corner edges, to receive the LED board 18 in a snap-fit connection. The outer edge of the base 16 can include one or more connecting features to connect to the optic 20. For example, one or more protrusions 26 can extend from the corners of the base 16 to engage the optic 20.

As best shown in FIG. 4, the second side of the base 16 includes a connecting feature 28 to connect the light module 10 to the support 12. In the exemplary embodiment shown, the connecting feature 28 is located substantially in the center of the base surrounding an opening. The exemplary connecting feature includes a ring 30 and one or more snap-fit connectors 32. The snap-fit connectors 32 include a flexible beam and a head having an angled surface and a hook portion. A flange 34 extends from the base 16. The center opening allows conductors to be based through the base to the LED board 18.

The LED board 18 includes one or more LEDs 36 connected to a circuit board 38. The LED board 18 includes four major side edges and chamfered corner edges, although other configurations can be used depending on the corresponding base 16. In various alternative embodiments, other types of light emitters may be used in the light modules 10.

Figure 8:
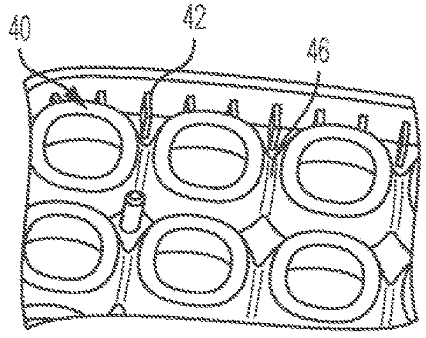
FIG. 8 is an enlarged, perspective view of an alternative exemplary optic.

FIGS. 5-11 show exemplary embodiments of an optic 20. The optic 20 modifies the light emitted from the LED board 18, for example to direct, reflect, and/or diffuse the light. The optic 20 is positioned over the LED board 18 and connected to the base 16. A plurality of reflector elements 40 extend from an outer surface of the optic 20, with a reflector element 40 positioned around each LED 36 when the lighting module 10 is assembled. A plurality of ribs 42 can be formed along one or more sides of the optic 20, for example an adjacent first and second side. A groove 44 can be formed in the corner of the optic 20 to receive a connecting protrusion 26 of the base 16. FIG. 8 depicts an exemplary embodiment where fillets 46 are formed between the reflector elements 40 on the back side of the optic 20.

In an exemplary embodiment the reflector elements 40 include an outer opening at the surface of the reflector 20, an inner opening positioned near the LED board 18, and a wall connecting the inner and outer openings. The inner opening can be smaller than the outer opening and the wall can be tapered, curved, or substantially parabolic between the inner and outer openings.

Figure 9:
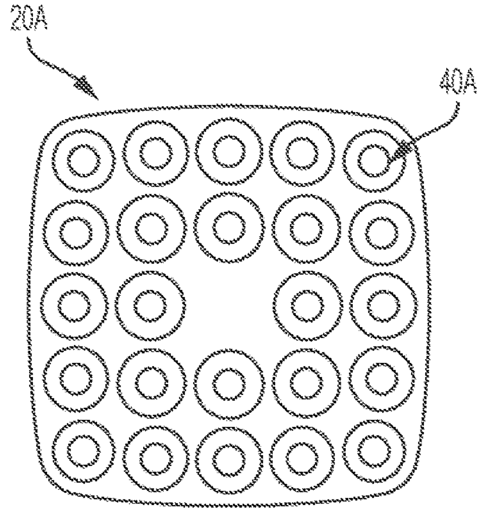
FIG. 9 is a bottom view of another exemplary optic.
Figure 10:
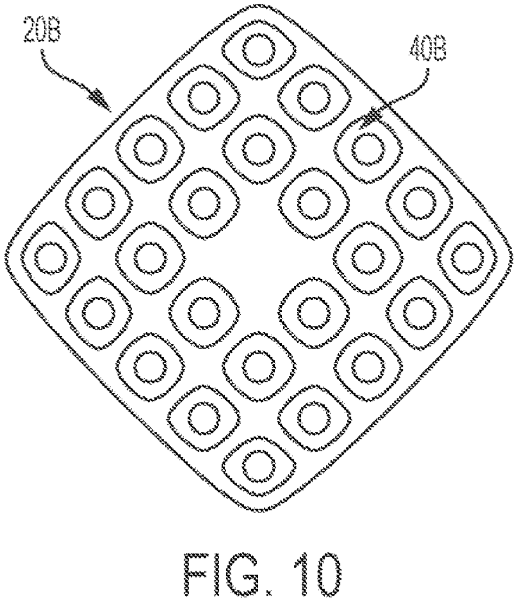
FIG. 10 is a bottom view of another exemplary optic.

As best shown in FIGS. 9 and 10, the outer openings and the inner openings can have different shapes or configurations. FIG. 9 shows reflector elements 40A having a substantially circular configuration arranged in a substantially square orientation of rows and columns. FIG. 10 shows reflector elements 40B have a substantially squircle or rounded square shape having a substantially diamond orientation. The reflector elements 40B can be separated into a left zone where they are elongated diagonally to the left, a right zone where they are elongated diagonally to the right, and the center zone having a substantially horizontal orientation. Different combinations of the two and other sizes, shapes, and configurations can also be used. FIGS. 9 and 10 show the inner openings as substantially circular, although the inner openings can also have a shape corresponding to the outer openings. Various alternative embodiments can use different sizes, shapes, and configurations of reflector elements 40, including any combination of curvilinear or rectilinear sides.

Figure 11:
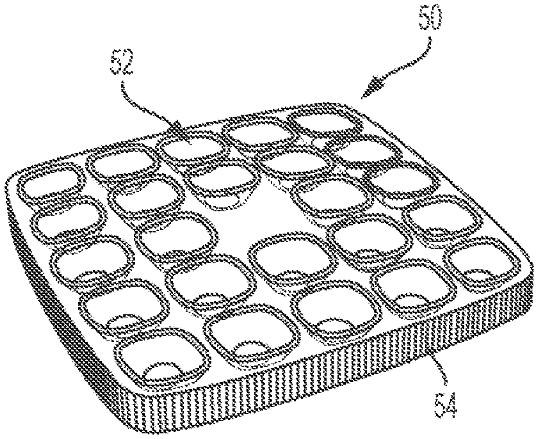
FIG. 11 is a bottom perspective view of another exemplary optic.

FIG. 11 shows an alternative embodiment of an optic 50 having a plurality of reflector elements 52 and a ribbed outer edge 54. The optic 50 can have reflector elements 52 with any of the configurations discussed above. The ribbed outer edge 54 can help to diffuse light around the edge of the optic 50.

Figure 12:
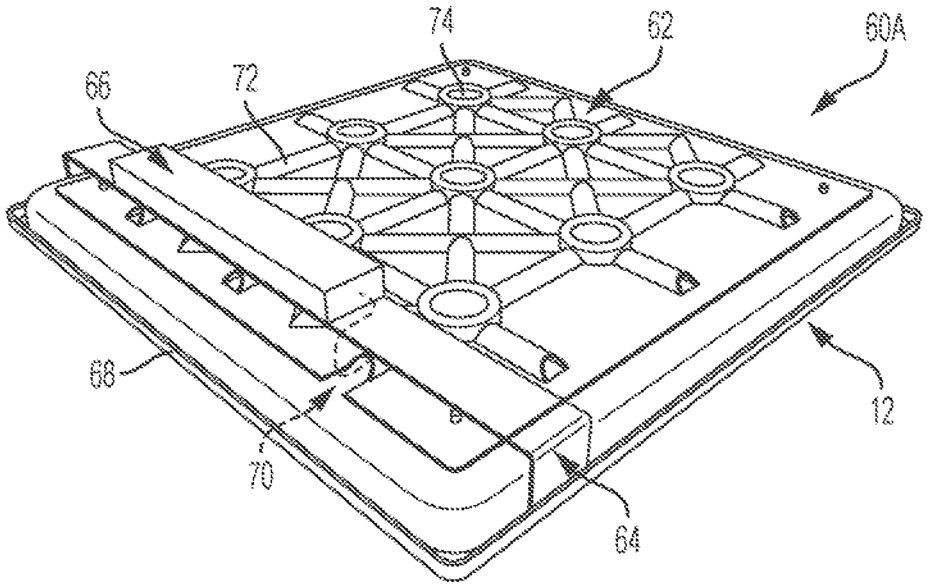
FIG. 12 is a top perspective view of an exemplary luminaire.
Figure 13:
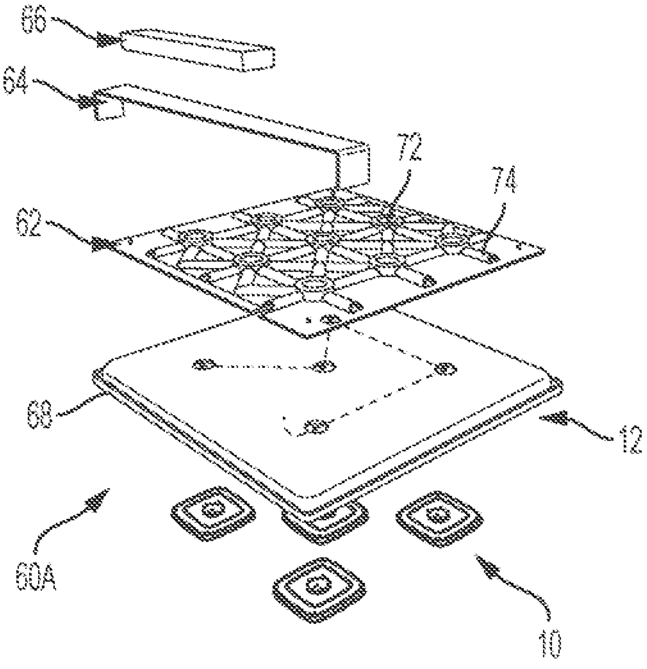
FIG. 13 is an exploded view of FIG. 12.
Figure 14:
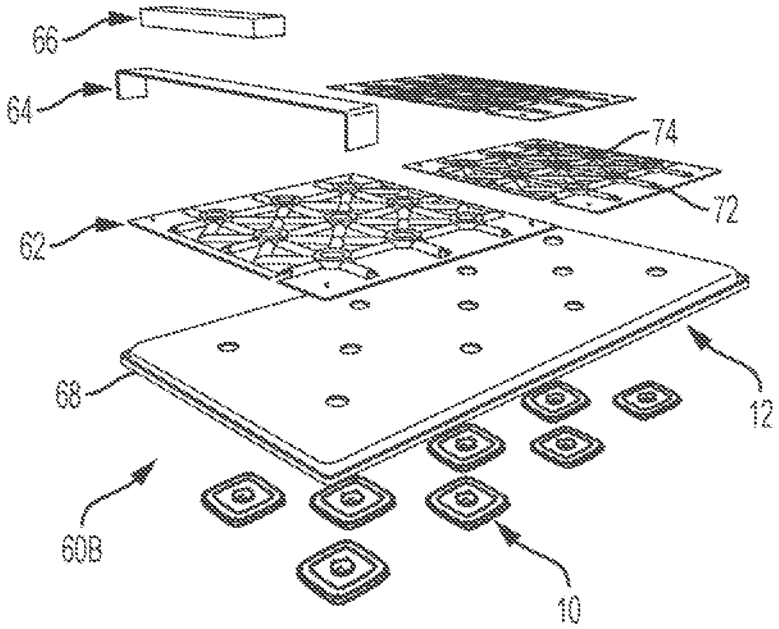
FIG. 14 is an exploded view of another exemplary luminaire.
Figure 15:
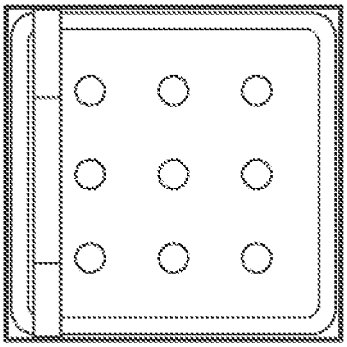
FIG. 15 is a rear schematic view of an exemplary luminaire.
Figure 16:
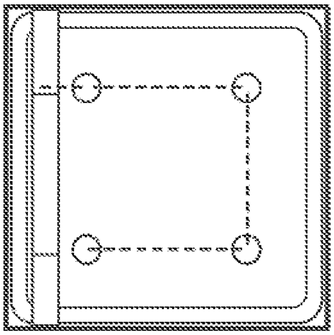
FIG. 16 is a rear schematic view of FIG. 15 having a first layout.
Figure 17:
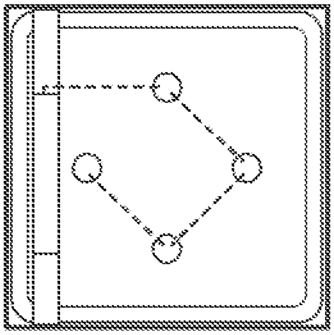
FIG. 17 is a rear schematic view of FIG. 15 having a second layout.
Figure 18:
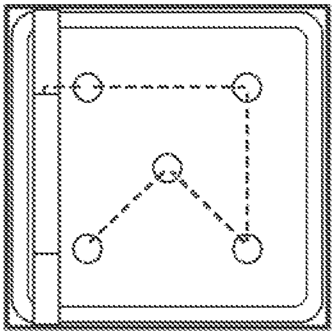
FIG. 18 is a rear schematic view of FIG. 15 having a third layout.

FIGS. 12-14 show exemplary embodiments of luminaires 60A, 60B utilizing light modules 10 connected to different sized supports 12. The luminaires also include a top cover 62, a driver bracket 64, and a driver 66. The driver 66 is connected to the support 12 by the driver bracket 64. The size, shape, and configuration of the driver bracket 64 can vary depending on the support. The type of driver 66 can vary depending on the light modules 10 and the desired light output. A flange 68 extends around an outer edge of the support.

The support 12 can be made from a metal or polymer material and can be formed through molding, casting stamping, or other suitable procedures. In an exemplary embodiment, the support 12 is thermo formed. The support 12 shown in FIGS. 12 and 13 has a substantially square configuration and connects to five light modules 10 while the support 12 shown in FIG. 14 has a substantially rectangular configuration utilizing eleven light modules 10. The support 12 can be formed to any size, shape, or configuration desired and the number of light modules 10 connected to the support 12 can be adjusted to achieve desired aesthetics or light outputs.

As shown in FIGS. 15-18 holes are formed in the support 12 corresponding to the number of light modules 10 used. These holes can be made after the support 12 is formed, so that a certain size support 12 can be given a variety of configurations. The light modules 10 are snap-fit to the support, with the snap connectors 32 extending through the opening in the support 12. One or more conductors or cables 70 extend from the driver 64 to the light modules 10. The path of the cable 70 can be modified depending on the arraignment and number of openings, with only a small sample of the types of arraignments being shown here.

As best shown in FIG. 12, the cover 62 includes a plurality of conduits 72 extending from one or more hubs 74 to enclose the conductors 70. Hubs 74 on an outer edge of the cover 62 can be connected to six different conduits 72 while hubs 74 on the interior can be connected to eight different conduits 72. Configurations using more or less conduits 72 may also be used. As best shown in FIG. 14, one or more covers 62 can be connected or placed adjacent one another if needed. The covers 62 can be formed from a plastic, metal, composite, or other suitable material.

The covers 62 are provided with a plurality of conduits 72 and hubs 74 so that conductors 70 extending from the driver 66 to the light modules 10 can take a number of different paths depending on the configuration and number of light modules 10 used.

Figure 19:
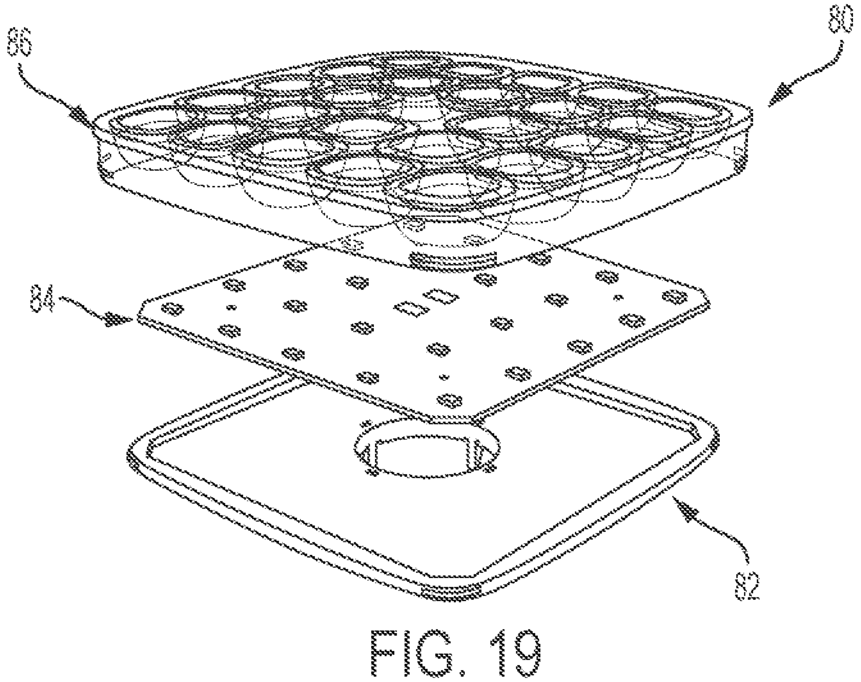
FIG. 19 is an exploded view of another exemplary light module.
Figure 20:
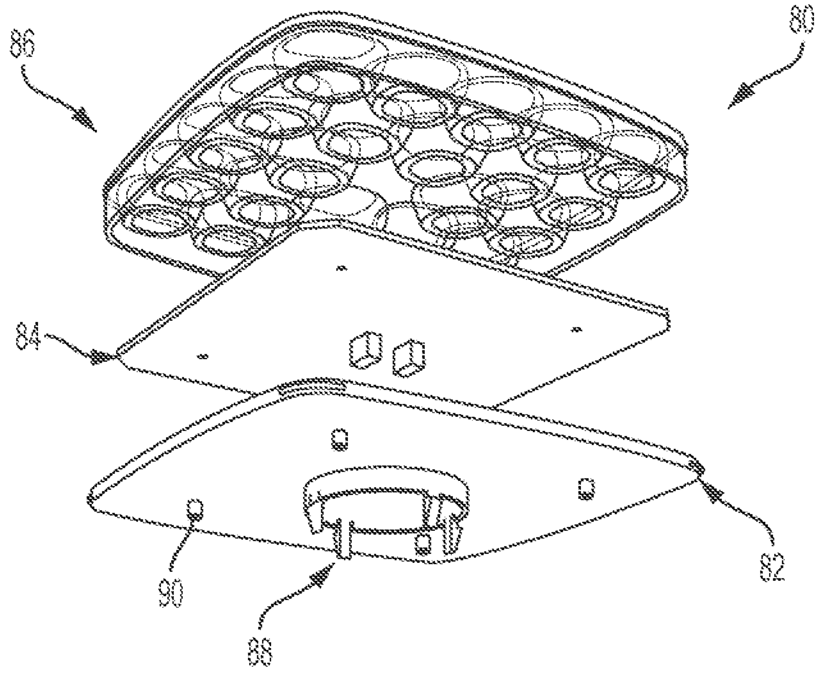
FIG. 20 is a top perspective view of FIG. 19.
Figure 21:
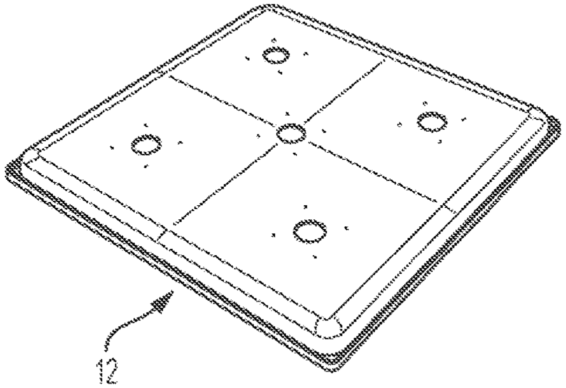
FIG. 21 is a top perspective view of an exemplary support.
Figure 22:
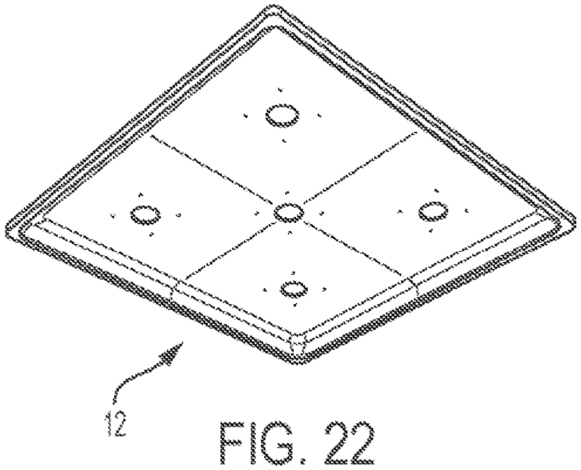
FIG. 22 is a bottom perspective view of FIG. 21.
Figure 23:
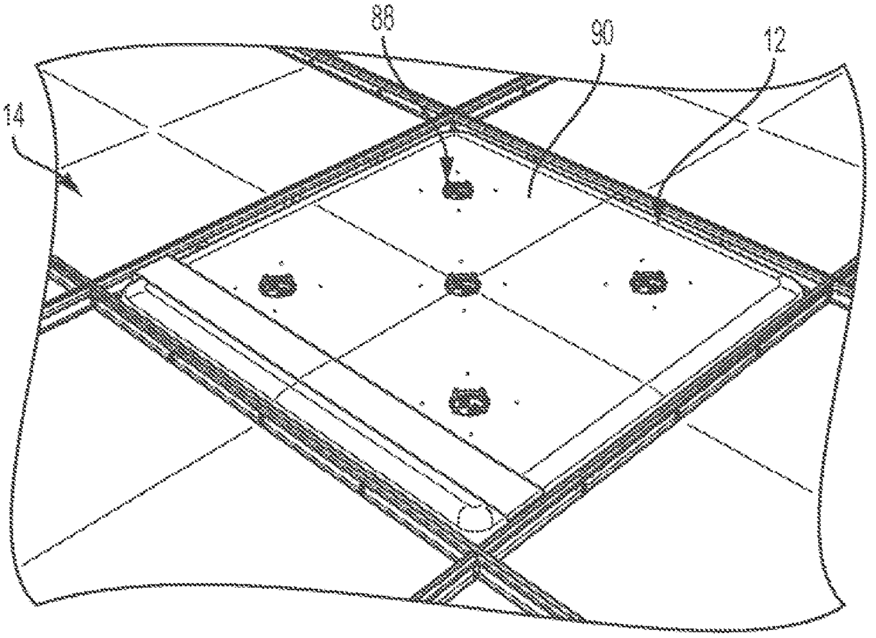
FIG. 23 is a top perspective view of the light module of FIG. 19 connected to the support of FIG. 21.

FIGS. 19 and 20 show another exemplary lighting module 80 having a base 82, an LED board 84, and an optic 86. The base 82 includes a connecting feature 88 and a plurality of protrusions 90 extending from the second side. FIGS. 21 and 22 show an exemplary support 12 for use with the light module 80. The support 12 includes a plurality of center openings corresponding to each light module 80. The openings can be formed in any number and configuration. A plurality of outer openings surrounds each center opening. The outer openings corresponding to the light module protrusions 90 so that at least a portion of the protrusions 90 extend into the outer openings. FIG. 23 shows the light modules 80 connected to the support 12 and the support 12 mounted in a ceiling 14.

Figure 24:
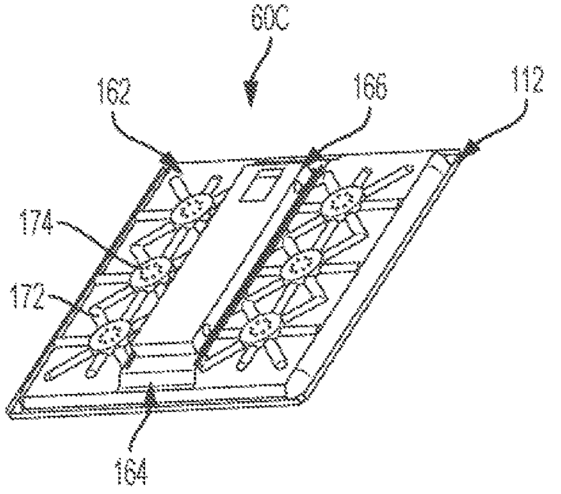
FIG. 24 is a top perspective view of another exemplary luminaire.
Figure 25:
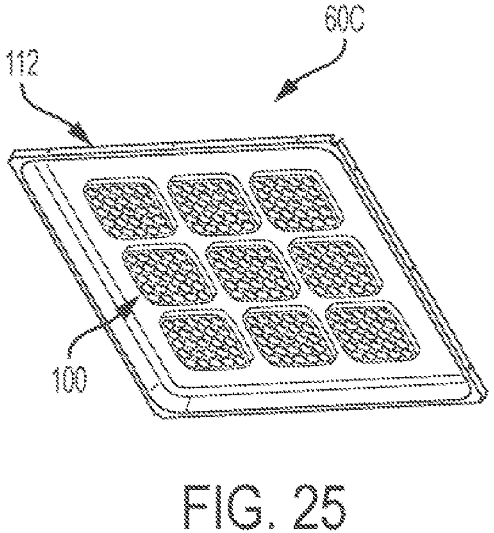
FIG. 25 is a bottom perspective view of FIG. 24.
Figure 26:
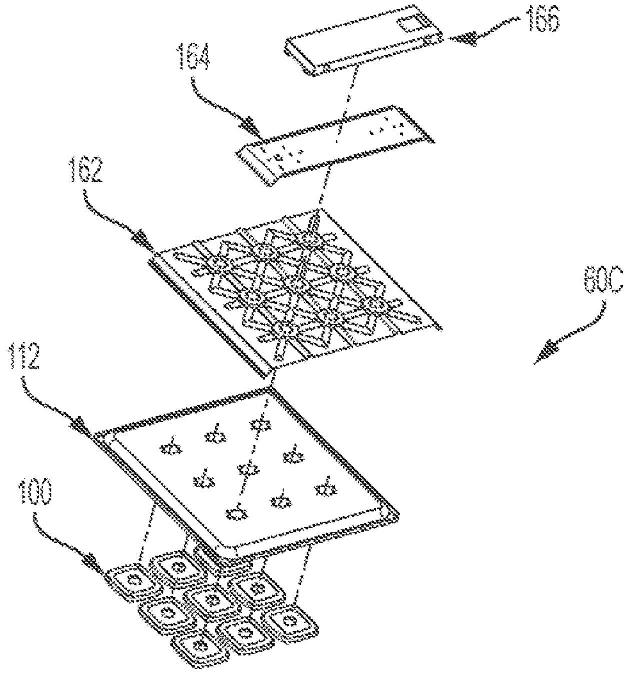
FIG. 26 is an exploded view of FIG. 24.

FIGS. 24-26 show another exemplary luminaire 60C including a plurality of light modules 100 connected to a support 112. The luminaire 60C also includes a top cover 162, a driver bracket 164, and a driver enclosure 166.

Figure 27:
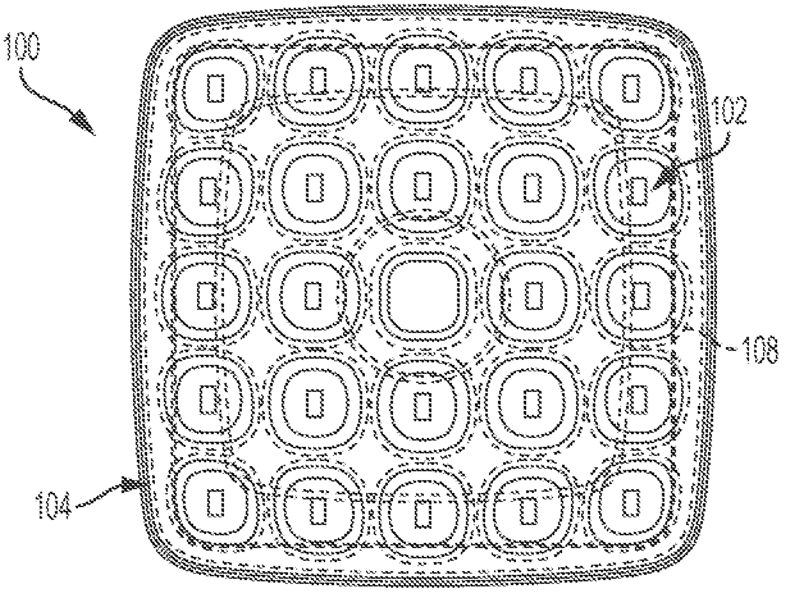
FIG. 27 is a bottom view of the light module of FIG. 24.
Figure 28:
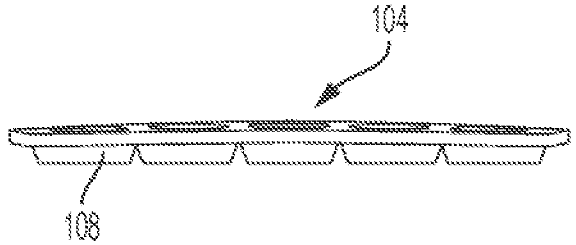
FIG. 28 is a side view of the optic of FIG. 27.
Figure 29:
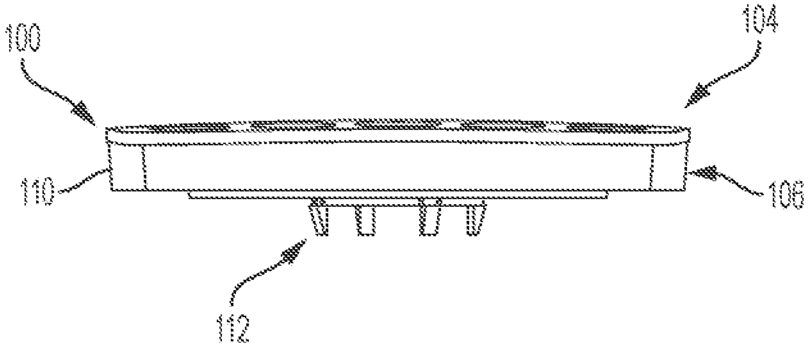
FIG. 29 is a side view of the light module FIG. 27.

FIGS. 27-29 show an exemplary embodiment of the light modules 100 having an LED board 102, an optic 104, and a base 106. The optic 104 includes a plurality of reflector elements 108. The side edge of the reflector elements 108 can include a plurality of ribs, prisms, or other light directing elements. The outer edge of the reflector 104 can also include a plurality of ribs, prisms, or other light directing elements. The base 106 has a side wall 110 and a connecting feature 112. The side wall 110 can include a plurality of ribs, prisms, or other light directing elements that can correspond to the light directing elements on the reflector 104.

Figure 30:
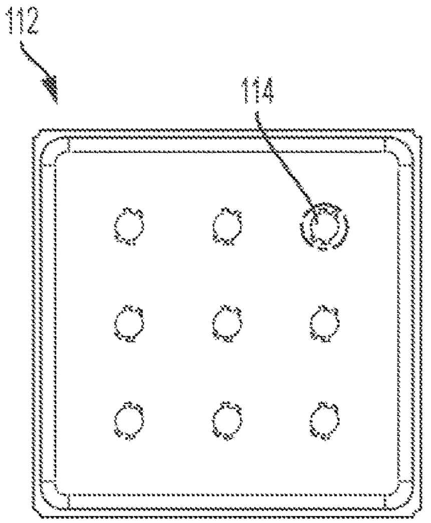
FIG. 30 is a bottom view of the support of FIG. 24.
Figure 31:
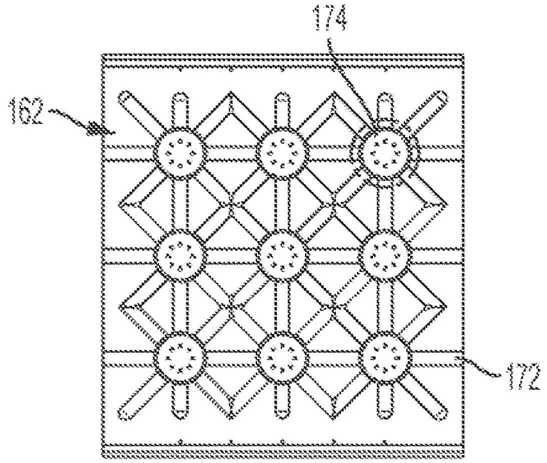
FIG. 31 is a top view of the cover of FIG. 24.

As best shown in FIG. 30, keyhole openings 114 are formed in the support 12 corresponding to the number of light modules 100 used. The keyhole openings 114 include a substantially circular opening and one or more slots extending from the opening. The slots receive at least a portion of the connecting feature 112 and retain the position of the light module 100 so that it can be set at a specific angle. In the exemplary embodiment shown, the angles are set at 0 and 45 degrees to the housing, although any angle can be used and additional slots may be provided.

Figure 32:
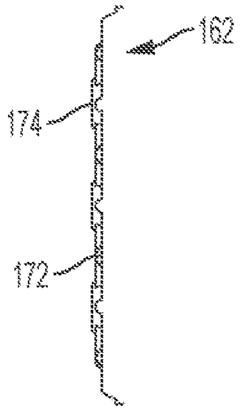
FIG. 32 is a side view of FIG. 31.

FIG. 32 shows an exemplary embodiment of a cover 162. The cover 162 includes a plurality of conduits 172 extending from one or more hubs 174 to enclose the conductors. The cover 162 can be formed from a plastic, metal, composite, or other suitable material. One or more holes can be provided in the hubs 174.

Figure 33:
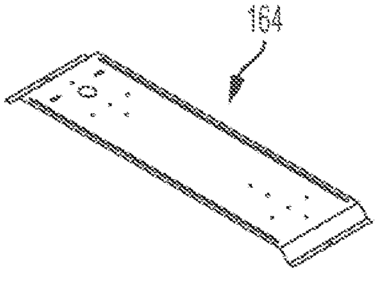
FIG. 33 is a top perspective view of the driver bracket of FIG. 24.
Figure 34:
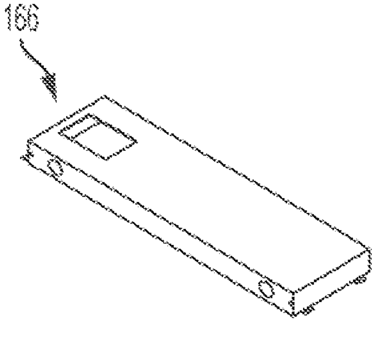
FIG. 34 is a top perspective view of the driver cover of FIG. 24.
Figure 35:
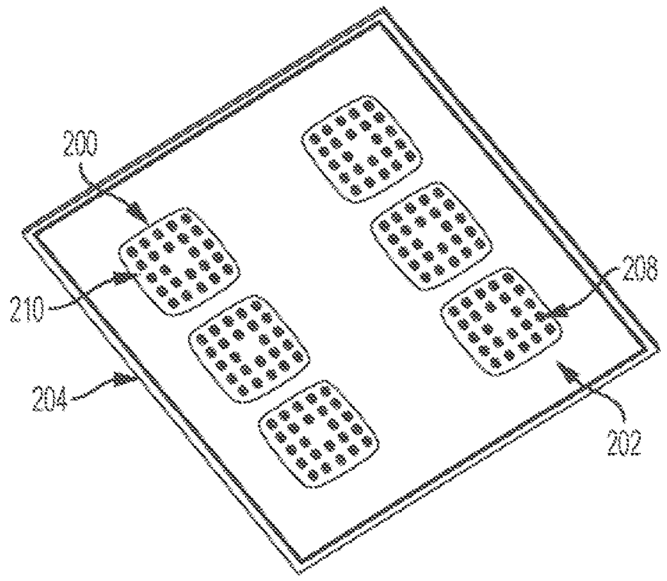
FIG. 35 is a bottom perspective view of another exemplary luminaire.

FIGS. 33 and 34 show a driver bracket 164 and a driver enclosure 166. The driver bracket 164 includes tabs at each end for connecting to the support 12. A driver can be connected to the driver bracket 164 and covered by the driver enclosure 166. The driver enclosure 166 and the driver bracket 164 each include one or more openings to facilitate the passage of conductors to the driver and to the LED modules 100.

FIGS. 35-40 show another exemplary embodiment of a luminaire having a light module 200. The light module is connected to a support 202 which is removably connected to a frame 204. The light module 200 includes a base 206, a light emitter 208, and an optic 210.

Figure 36:
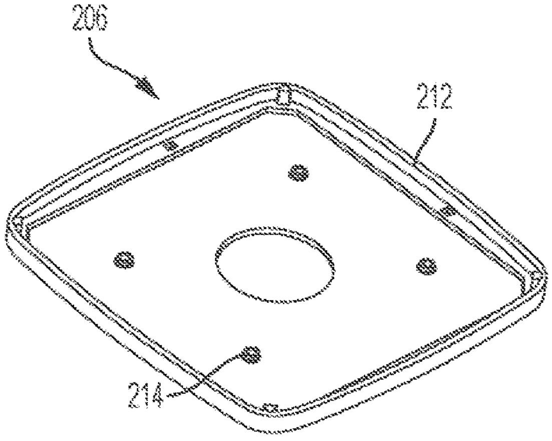
FIG. 36 is a bottom perspective view of an exemplary base.

FIG. 36 shows an exemplary embodiment of the base 206 having an outer wall 212, central opening, and a set of bosses 214. The outer wall 212 defines a cavity for receiving the light emitter 208. One or more openings are provided around the cavity to connect to the optic 210.

Figure 37:
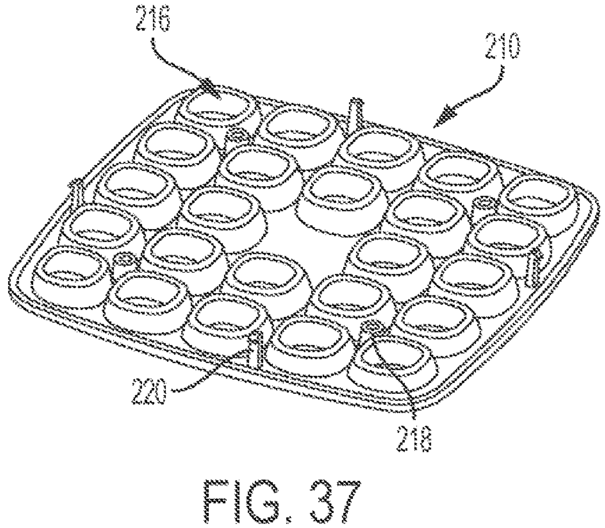
FIG. 37 is a top perspective view of an exemplary optic.

FIG. 37 shows the rear of an exemplary optic 210. The optic includes a plurality of reflector elements 216, one or more bosses 218, and one or more connecting features 220. The reflector elements 216 an include any of the features discussed herein. In the embodiment shown, the connecting features **22*o* include a flexible arm and a hook for making a snap-fit connection with the support 202 and/or the base 206**.

Figure 38:
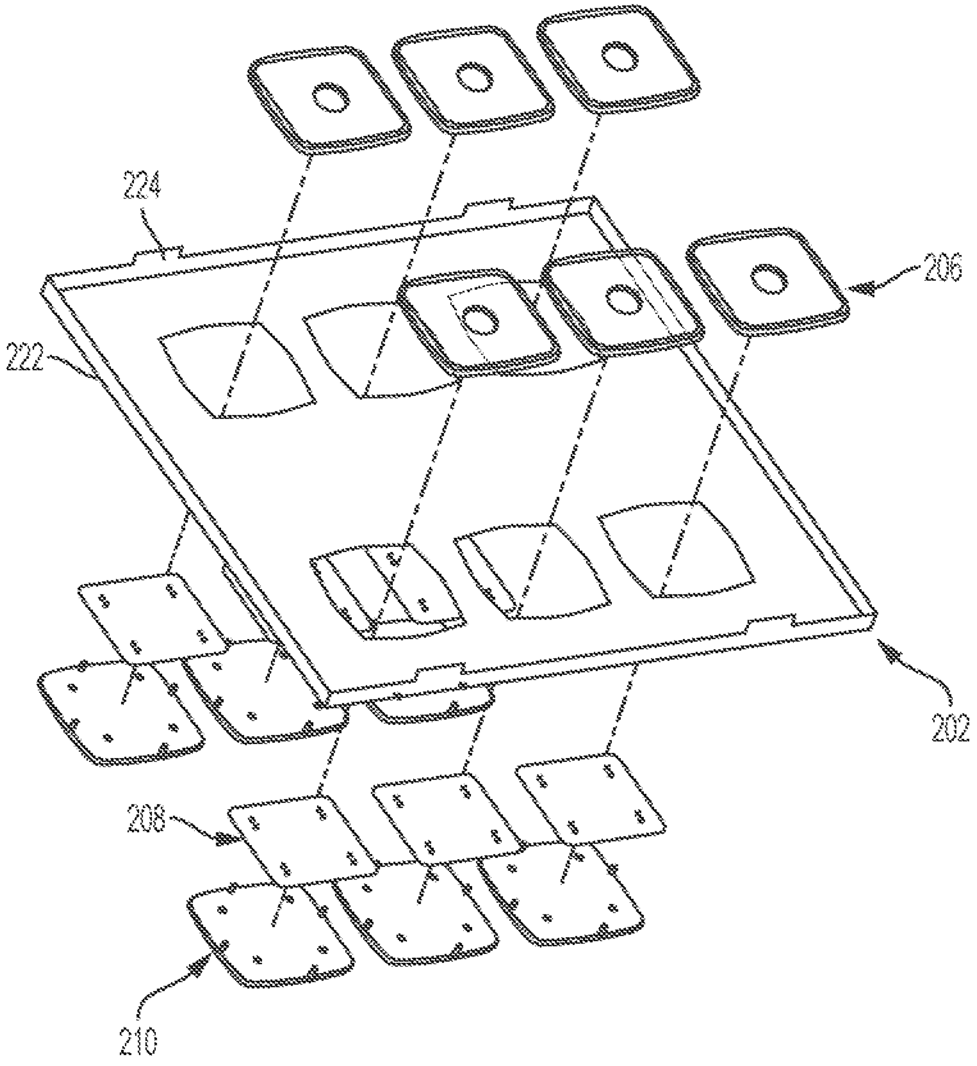
FIG. 38 is top exploded view of the light modules and support of FIG. 35.
Figure 39:
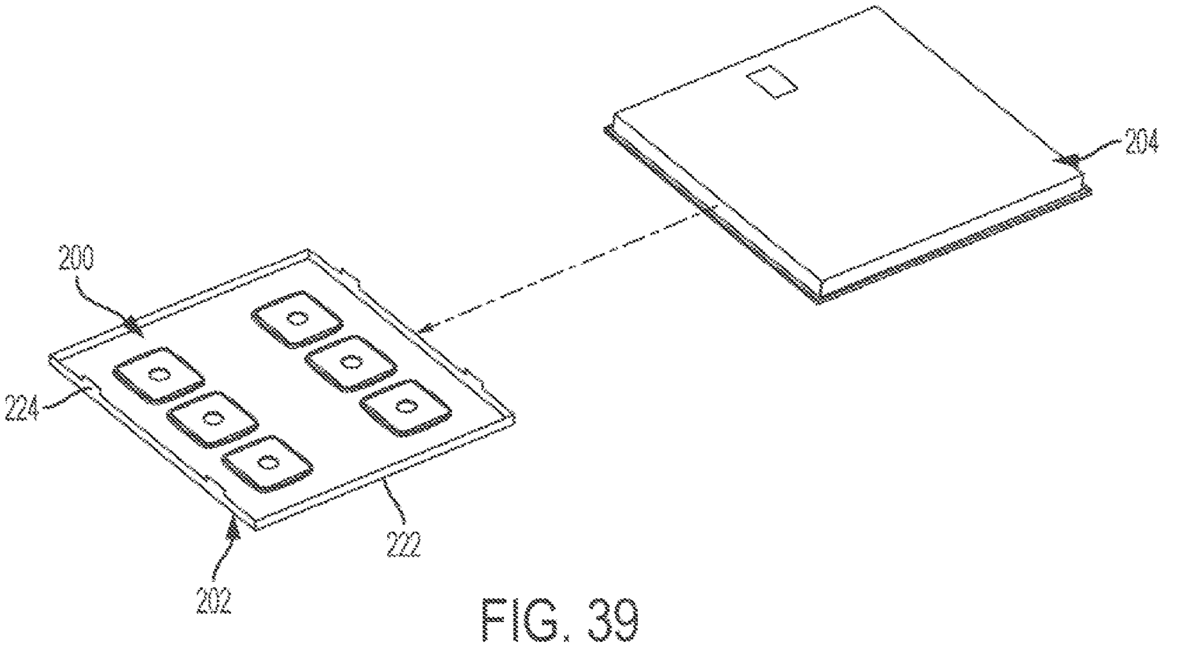
FIG. 39 is a top perspective view of the luminaire of FIG. 35 with the support and frame separated.
Figure 40:
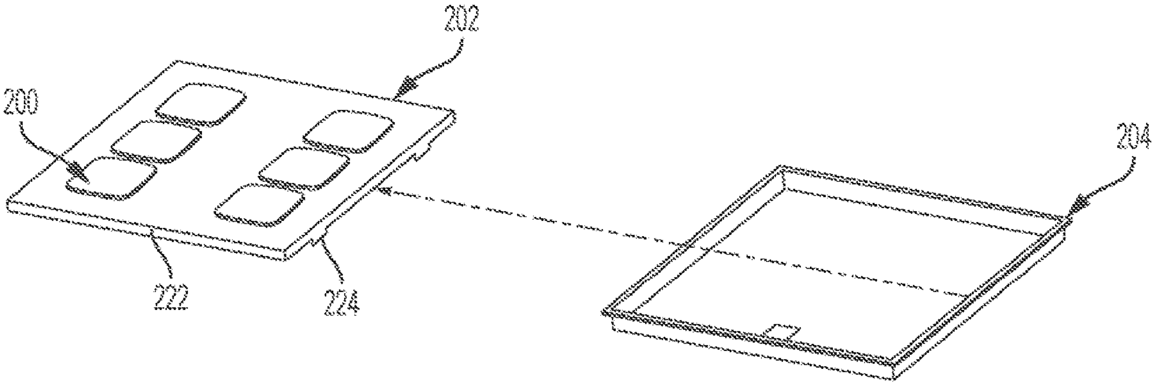
FIG. 40 is a bottom perspective view of FIG. 39.

As best shown in FIG. 38, the support includes a side wall 222 having one or more tabs 224. One or more openings in the support accommodate one or more light modules 200. The support 202 can be made to any size or shape and the openings can be formed with the support, for example through molding or a stamping procedure, or formed later, for example through cutting. When assembling the light module 200, the optic 210 is connected to a first side of the support 202, the base 206 is positioned on the second side of the support 202, and the light emitter 208 is positioned between the optic 210 and the base 206. In an exemplary embodiment, the openings in the support are sized to receive at least a portion of the optic 210 but are smaller than the base 206. The optic 210 is connected to the support 202 or the base 206 through the connecting feature 220. The bosses 214 on the base 206 align with the bosses 218 on the optic 210, and a fastener can be used to connect the base 206 to the optic 210. After the light module 200 is connected, the support 202 can be positioned in, and connected to, a frame 204 as shown in FIGS. 39 and 40.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A luminaire comprising:

a support positioned in a ceiling;

a light module connected to the support, the light module having a base, a light emitter, and an optic, with the base having a first side with a recessed portion for receiving the light emitter and a second side facing the support;

a connecting feature extending from the second side of the base to connect the light module to the support, wherein the connecting feature includes a snap fit connector;

the light emitter having a plurality of light elements;

wherein the support includes a first opening and the base includes a second opening in communication with the first opening, and wherein the first opening includes a first keyhole slot associated with a first light module orientation and a second keyhole slot associated with a second light module orientation.

2. The luminaire of claim 1, wherein the support is a ceiling pan.

3. The luminaire of claim 1, wherein the base includes a protrusion extending from the second side and the support includes a third opening receiving the protrusion.

4. The luminaire of claim 1, wherein the connecting feature includes a first and second snap fit connector.

5. The luminaire of claim 1, wherein the light emitter is snap-fit to the base.

6. The luminaire of claim 1, wherein the support includes a first side and a second side and the luminaire further comprises a top cover positioned over at least a portion of the second side of the support, a driver bracket connected to the second side of the support, and a driver connected to the driver bracket and operably connected to the light emitter.

7. A luminaire comprising:

a support positioned in a ceiling, the support having a first side and a second side;

a light module connected to the support, the light module having a base, a light emitter, and an optic;

a cover positioned over at least a portion of the second side of the support, wherein the cover includes a hub and at least one conduit extending from the hub;

a driver bracket connected to the second side of the support; and a driver connected to the driver bracket and operably connected to the light emitter.

8. The luminaire of claim 7, wherein the support includes an opening for receiving the light module and the hub is positioned over the opening.

9. The luminaire of claim 8, wherein a conductor extends from the driver, through the at least one conduit, and into the hub to connect to the light module through the opening.

10. The luminaire of claim 7, further comprising a driver enclosure connected to the driver bracket over the driver.

11. The luminaire of claim 7, wherein the base is positioned adjacent the second side of the support and the light emitter and the optic are positioned adjacent the second side of the support.

12. The luminaire of claim 7, wherein the base has a first side with a recessed portion for receiving the light emitter and a second side facing the support, a connecting feature extends from the second side of the base to connect the light module to the support, the light emitter has a plurality of light elements, and the optic includes a plurality of optical elements aligned respectively with the plurality of light elements.

13. A method of assembling a luminaire comprising:

forming an opening in a support, the opening corresponding to a light module, the light module having a base, a light emitter, and an optic;

connecting the light module to the support with a snap-fit connection extending through its corresponding opening;

connecting a driver to the support; and electrically connecting the driver to the light emitter of the light module.

14. The method of claim 13, wherein a cover is connected to the support, the cover having a hub and at least one conduit extending from the hub.

15. The method of claim 14, wherein one or more conductors extend from the driver, through the at least one conduit, and into the hub to electrically connect the driver to the light emitter.

16. The method of claim 13, wherein the driver is connected to the support by a driver bracket and an enclosure is positioned over the driver.

* * * * *